United States Patent [19]
Girts, Jr.

[11] Patent Number: 5,292,006
[45] Date of Patent: Mar. 8, 1994

[54] SCREENING APPARATUS

[76] Inventor: David M. Girts, Jr., 8553 Findley Lake Rd., North East, Pa. 16428

[21] Appl. No.: 818,271

[22] Filed: Jan. 8, 1992

[51] Int. Cl.$^5$ ............................................... B07B 1/00
[52] U.S. Cl. ................................... 209/242; 209/246; 209/260; 209/315; 209/317
[58] Field of Search ........................... 209/240-242, 209/243, 244-246, 258, 260, 315, 317; 198/524

[56]  References Cited
U.S. PATENT DOCUMENTS

| | | | |
|---|---|---|---|
| 1,089,433 | 3/1914 | Oliver | 209/317 |
| 1,573,166 | 2/1926 | Hutchinson | 209/317 |
| 2,107,532 | 2/1938 | Hallenbeck | 209/260 |
| 2,615,567 | 10/1952 | Campbell | 209/242 |
| 3,005,540 | 10/1961 | Hinderaker | 198/524 |
| 3,402,816 | 9/1968 | Taylor | 209/260 |
| 3,756,372 | 9/1973 | Mertens | 198/524 |
| 4,190,526 | 2/1980 | Bachard | 209/245 |
| 4,197,194 | 4/1980 | Read | 209/325 |
| 4,256,572 | 3/1981 | Read | 209/257 |
| 4,998,625 | 3/1991 | Read | 209/260 |
| 5,082,555 | 1/1992 | Read | 209/246 |
| 5,112,974 | 5/1992 | Douglas | 209/245 |

FOREIGN PATENT DOCUMENTS

| | | | |
|---|---|---|---|
| 167642 | 5/1956 | Australia | 209/246 |
| 137430 | 9/1979 | Fed. Rep. of Germany | 209/246 |
| 908701 | 3/1982 | U.S.S.R. | 198/524 |
| 8140 | of 1910 | United Kingdom | 209/246 |

*Primary Examiner*—Robert P. Olszewski
*Assistant Examiner*—Steven M. Reiss
*Attorney, Agent, or Firm*—Lovercheck and Lovercheck

[57]  ABSTRACT

A screening plant having a feed plate located between a grizzly grate and a conveyor driven by a hydraulic motor. A first source of fluid supplies hydraulic fluid to a first cylinder to open the feed plate and to a second hydraulic cylinder to swing the grizzly grate. A second source of fluid provides hydraulic fluid to the hydraulic motor driving the conveyor and to a sequence valve at a pressure determined by the load on the motor. The sequence valve stops the flow of fluid to the second cylinder stopping the feed plate when the pressure of fluid from the second source of fluid reaches a predetermined value so that the conveyor will not be overloaded. The feed plate has to open at a preset speed and is started and stopped by the discharging conveyor, as the conveyor meets its capacity. When the feed plate reaches full open position, it activates a control that lifts the grizzly grate and dumps off large pieces of material. The grizzly grate is also controlled by the discharge conveyor. The grizzly grate completes its cycle by returning to the start position automatically.

13 Claims, 5 Drawing Sheets

SCREENING APPARATUS

BACKGROUND OF THE INVENTION

This invention relates to an aggregate screening apparatus and more particularly to a portable screening apparatus which can be readily transported and deployed at a remote site for providing gravel or other screened particulate material.

U.S. Pat. Nos. 4,190,526 to Bachand; 4,197,194 to Read and 4,256,572 to Read all show examples of efforts to solve certain existing problems in the art of screening plants.

SUMMARY OF THE INVENTION

The screening plant of the present invention has a hopper, a grizzly grate, a feed plate, a screen and a conveyor. The grizzly grate is inclined by a double acting grizzly cylinder. The conveyor is driven by a hydraulic motor. The feed plate is opened and closed by a double-acting feed plate cylinder. The feed plate is disposed between the grizzly grate and the screen.

A first hydraulic pump supplies hydraulic fluid through three-way valves to the pistons of the feed plate cylinder and the grizzly cylinder. A second pump supplies hydraulic fluid to the hydraulic motor and to a sequence control valve. The sequence control valve exhausts the hydraulic cylinder and the feed plate cylinder when the hydraulic pressure of fluid to the hydraulic motor reaches a predetermined pressure to which the sequence valve has been set, thereby stopping the feed plate cylinder until the load on the conveyor is reduced. The pressure of the hydraulic fluid to the motor increases in proportion to the load of screened material on the conveyor until the hydraulic fluid pressure to the conveyor drops below the set pressure. Thus, the movement of the feed plate stops the feed of material to the screen when the conveyor is overloaded and no more material is screened until the conveyor discharges part of its load.

In placing material to the screened on the grizzly grate, the loader bucket engages actuating means on the feed plate valve which connects the hydraulic fluid from the first pump to the feed plate cylinder respectively. When the feed plate reaches its full open position the feed plate engages a control on the feed plate three-way valve and the control on the grizzly three-way valve reversing the flow of hydraulic fluid to the feed plate cylinder and to the grizzly cylinder. Thus moving the feed plate to a closed position and moving the grizzly grate to an inclined position dumping large pieces of material from the grizzly grate. The feed plate is located above the screen and it regulates flow of material to the screen and from the screen to the conveyor and prevents jamming by material from the conveyor.

More specifically, it is an object of the invention to provide an improved screening plant.

Another object of the invention is to provide a screening plant that is simple in construction, economical to manufacture and simple and efficient to use.

Another object of the invention is to provide a screening plant wherein hydraulic pressure to a conveyor and the hydraulic conveyor drive motor limits the feed rate of material to the screen.

Another object of the invention is to provide a screening plant that is automatic in operation.

With the above and other objects in view, the present invention consists of the combination and arrangement of parts hereinafter more fully described, illustrated in the accompanying drawing and more particularly pointed out in the appended claims. It being understood that changes may be made in the form, size, proportions and minor details of construction without departing from the spirit or sacrificing any of the advantages of the invention.

DETAILED DESCRIPTION OF THE DRAWING

Figure 1:
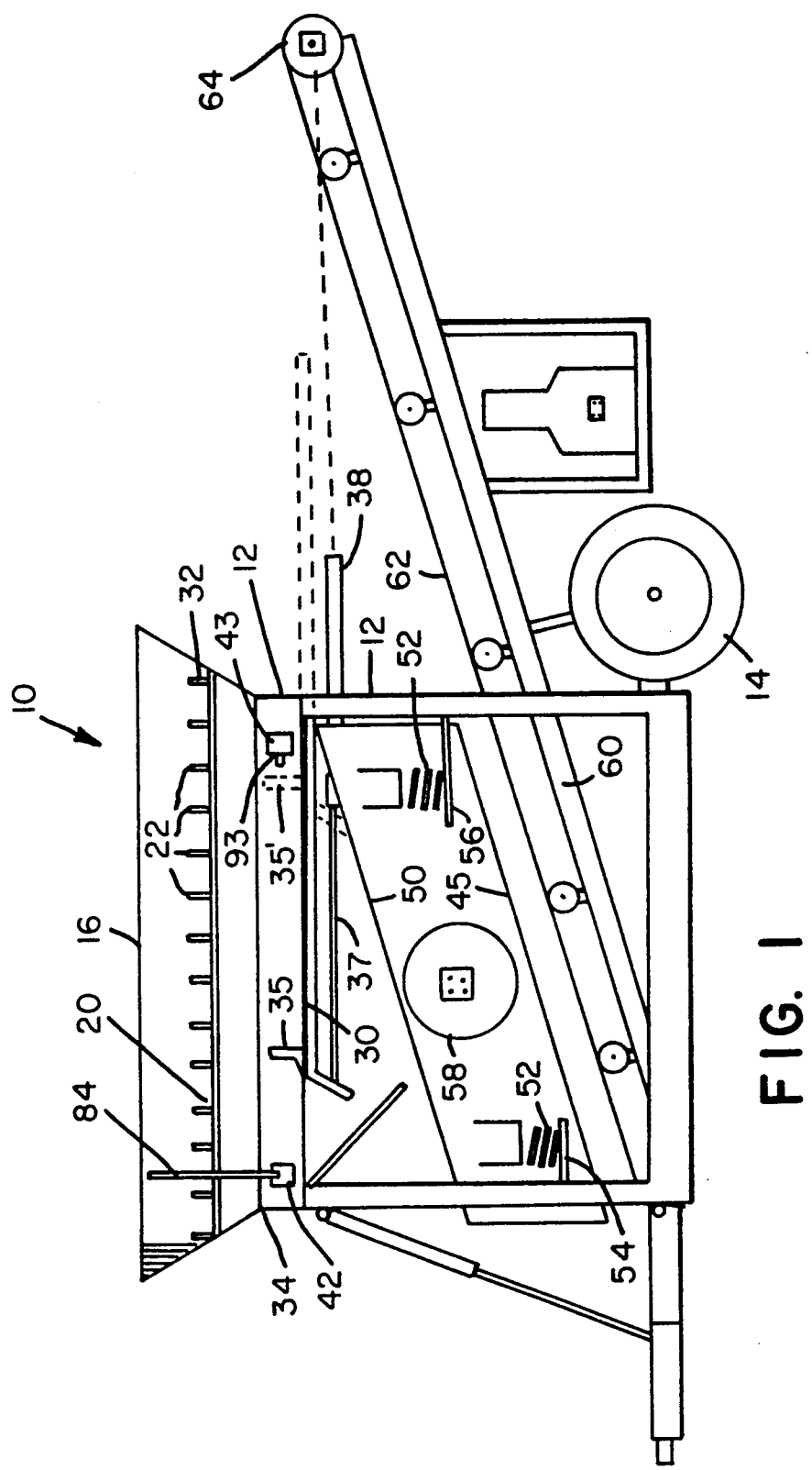
FIG. 1 is a side view of the screening plant according to the invention.

Now with more particular reference to the drawing, screening plant 10 and mechanical loader 11, which may be a front end loader, are shown. Screening plant 10 has frame 12 and ground engaging wheels 14.

Mechanical loader 11 has loading bucket 82 lifted by hydraulic cylinder 93 for loading hopper 16. Grizzly cylinder 40 lifts grizzly grate 20. Hopper 16 has upwardly extending sides 18 and is supported on grizzly grate frame 32 which is supported on frame 12 at pivot 33 to swing from the full line position to the phantom line discharge position shown in FIG. 2.

Grizzly grate 20 has generally parallel spaced grizzly bars 22 supported on rectangular grizzly grate frame 32 and spaced to divert large size pieces of material 72 and to allow smaller pieces to pass on feed plate 30 and then fall on first screen 50. Grizzly cylinder 40 is pivoted to frame 12 at position 33 with grizzly piston rod 37 pivoted to grizzly grate 20 at pivot 29.

Feed plate 30 is supported on frame 12. Feed plate cylinder 38 slides feed plate cylinder from closed position to open position below grizzly grate 20.

First screen 50 and second screen 15 are of different sizes and may be located in the space between feed plate 30, so that material falls from grizzly grate 20 onto feed plate 30 from which is fed by feed plate 30 onto first screen 50, and the material passing through first screen 50 is re-screened by second screen 15 and then falls onto conveyor 60. First screen 50 is supported on frame 12 by springs 52, which are supported on frame 12 by first bracket 54 and second bracket 56. First bracket 54 and second bracket 56 are welded to frame 12. Vibrator 58, which is a type familiar to those skilled in the art, is connected to first screen 50 and is driven by conveyor motor 64. Conveyor 60 is supported on frame 12 and has conveyor belt 62 supported below first screen 50.

To start the screening plant with feed plate 30 is in its closed position shown in full line position in FIG. 1, loading bucket 82 of mechanical loader 11 places materials 70 to be screened on grizzly grate 20 and engages control level 84 opening feed plate valve 42 which applies fluid pressure to feed plate cylinder 38. Fluid is supplied through feed plate valve 42 to feed plate cylinder 38 which exerts a force on feed plate 30 to start its motion toward open position and to start other screened material 74 to conveyor 60.

Figure 2:
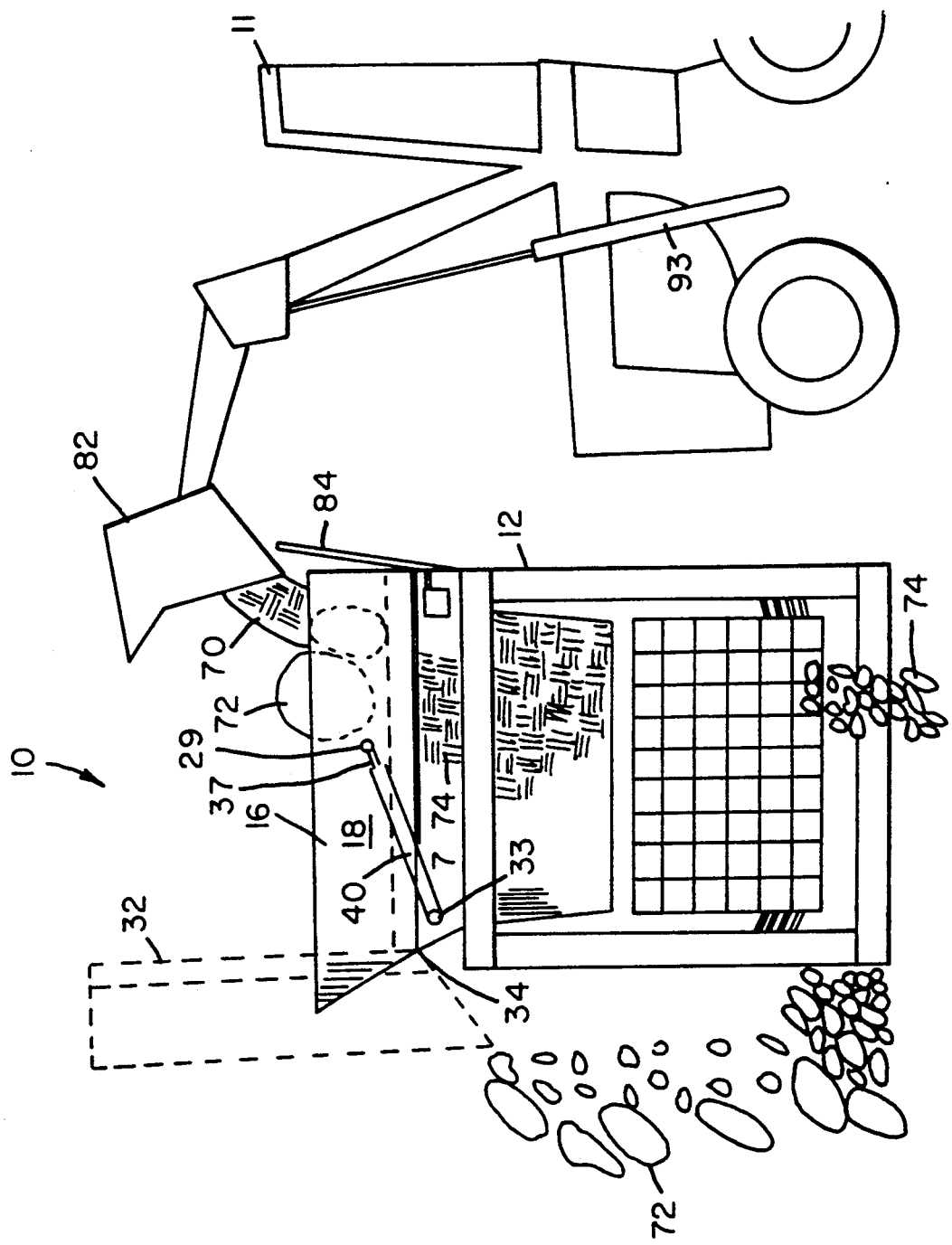
FIG. 2 is an end view of the screening plant shown with a tractor loader loading material on the screening plant.
Figure 3:
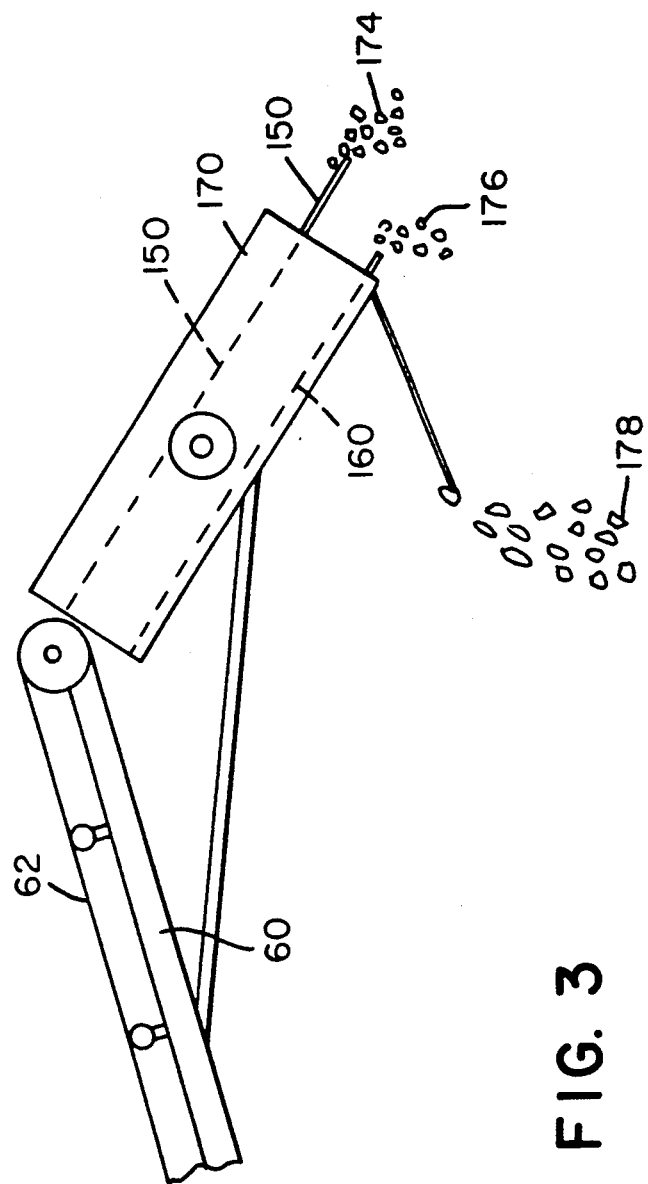
FIG. 3 is a partial side view of a second embodiment of the invention showing two screens at the out fall end of the conveyor.

A second embodiment shown in FIG. 3 comprises third screen 150 which can be added at the end of conveyor 60, shown in FIGS. 1 and 2 so that the material carried by conveyor 60 can be re-screened and other screened material 174 from third screen 150 can be transported to a bin, stacked, piled or trucked away. The material passing through third screen 150 can fall on fourth screen 160 and other screened material 174.

Feed plate cylinder 38 having piston 39 with piston rod 31 engages bracket 35. Auxiliary feed plate cylinder 38a has piston rod 31a which engages bracket 35 during the initial part of its travel to accelerate the initial motion of feed plate 30. Bracket 35 is carried from the dotted line position away from piston rod 31a when piston rod 31 reaches the end of its stroke. Feed plate cylinders 38 and 38a are connected parallel to each other. Grizzly cylinder 40 has piston 41 and piston rod 37 which is attached to grizzly grate 20. Feed plate cylinder 38 and auxiliary feed plate cylinder 38a are operated by hydraulic oil from second pump 94 through line 99, flow control 92 and feed plate valve 42.

Auxiliary feed plate cylinder 38a is shorter than feed plate cylinder 38, auxiliary feed plate cylinder 38a reaches the end of its stroke when feed plate 30 has moved only a short distance. Further movement of feed plate 30 is taken over by feed plate cylinder 38 and auxiliary feed plate cylinder 38a which caries the entire load of opening feed plate 30 further. This increases the initial opening rate of feed plate 30. When feed plate 30 reaches its full open position, it engages hydraulic cylinder 93 on grizzly valve 43. Large size pieces of material 72 deposited on grizzly grate 20 will not pass between grizzly grate bars 22, but will rest on grizzly grate bars 22 and will slide off the end of grizzly grate 20 only when grizzly grate 20 is moved to its doted line position as shown in FIG. 2 after feed plate 30 reaches it full open position. Other screened material 74 will fall through grizzly grate 20 onto feed plate 30.

Feed plate 30 starts to open when loading bucket 82 engages control lever 84 and activates feed plate valve 42. When feed plate 30 is moved toward and open position, other screened material 74 will fall onto first screen 50. First screen 50 will direct large size pieces of material 72 to one side, other screened material 74 will fall onto second screen 15. Second screen 15 will screen the smaller parts onto conveyor 60 which increases the load on conveyor 60.

Sequence valve 46 is an adjustable pressure sequence valve having piston 4 and pilot line 47. Piston 41 may be manually set to open when the hydraulic pressure in pilot line 47 corresponds to the predetermined load or maximum load that conveyor 60 is intended to carry. Sequence valve 46 opens to drain 53 when the set pressure on sequence valve 46 is exceeded. Feed plate valve 42 and grizzly valve 43 are both three-position, three-way valves having an intermediate off position.

In operation, diesel engine 19 will drive first pump 44 and second pump 94. The operator will deposit other screened material 74 to be screened onto grizzly grate 20 by means of mechanical loader 11. The operator will cause loading bucket 82 to engage control lever 84 which will in turn engage shift control 27 on feed plate valve 42. The material screened by second screen 15 will fall onto conveyor 60.

Figure 4:
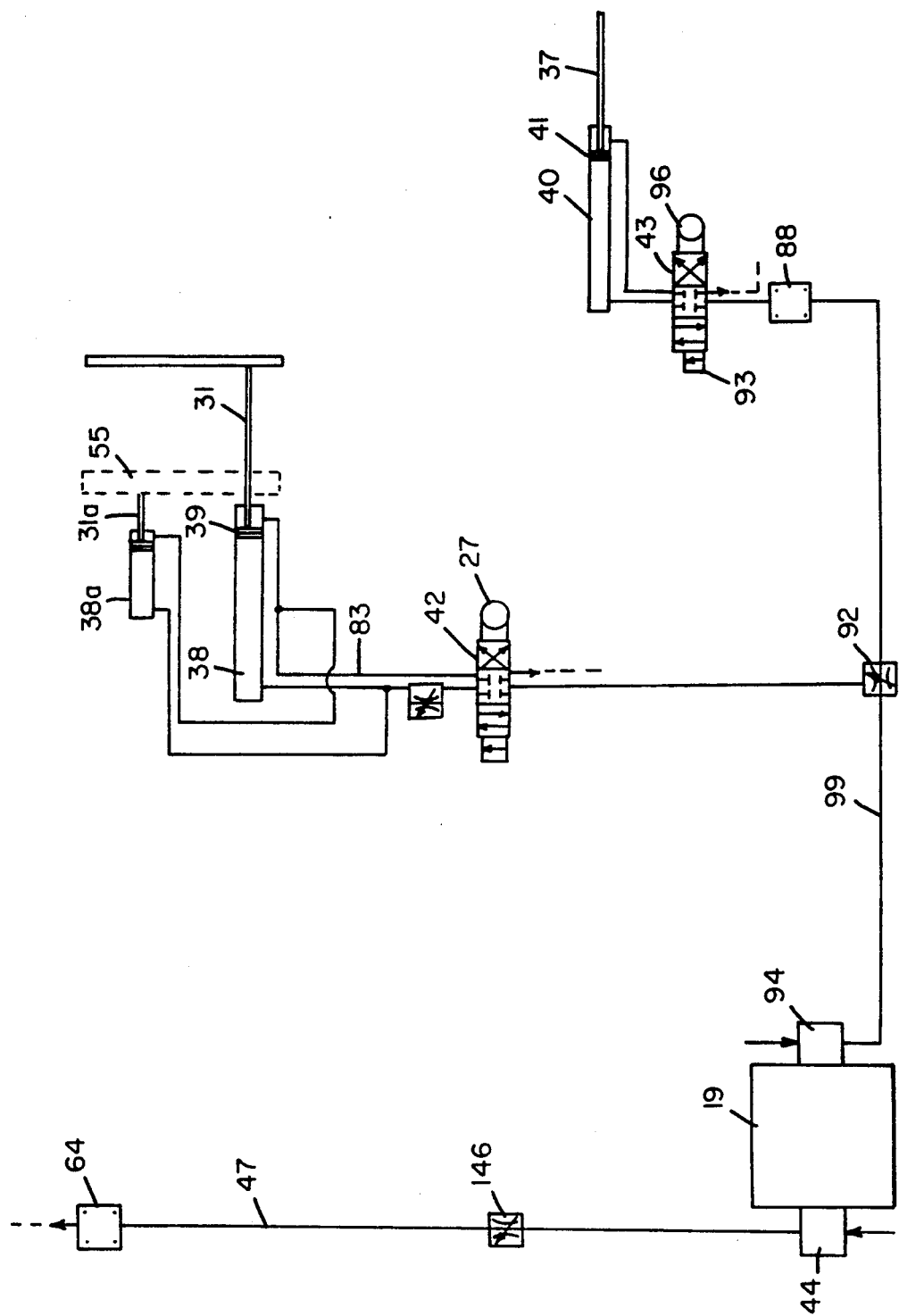
FIG. 4 is a hydraulic circuit of the screening plant.
Figure 5:
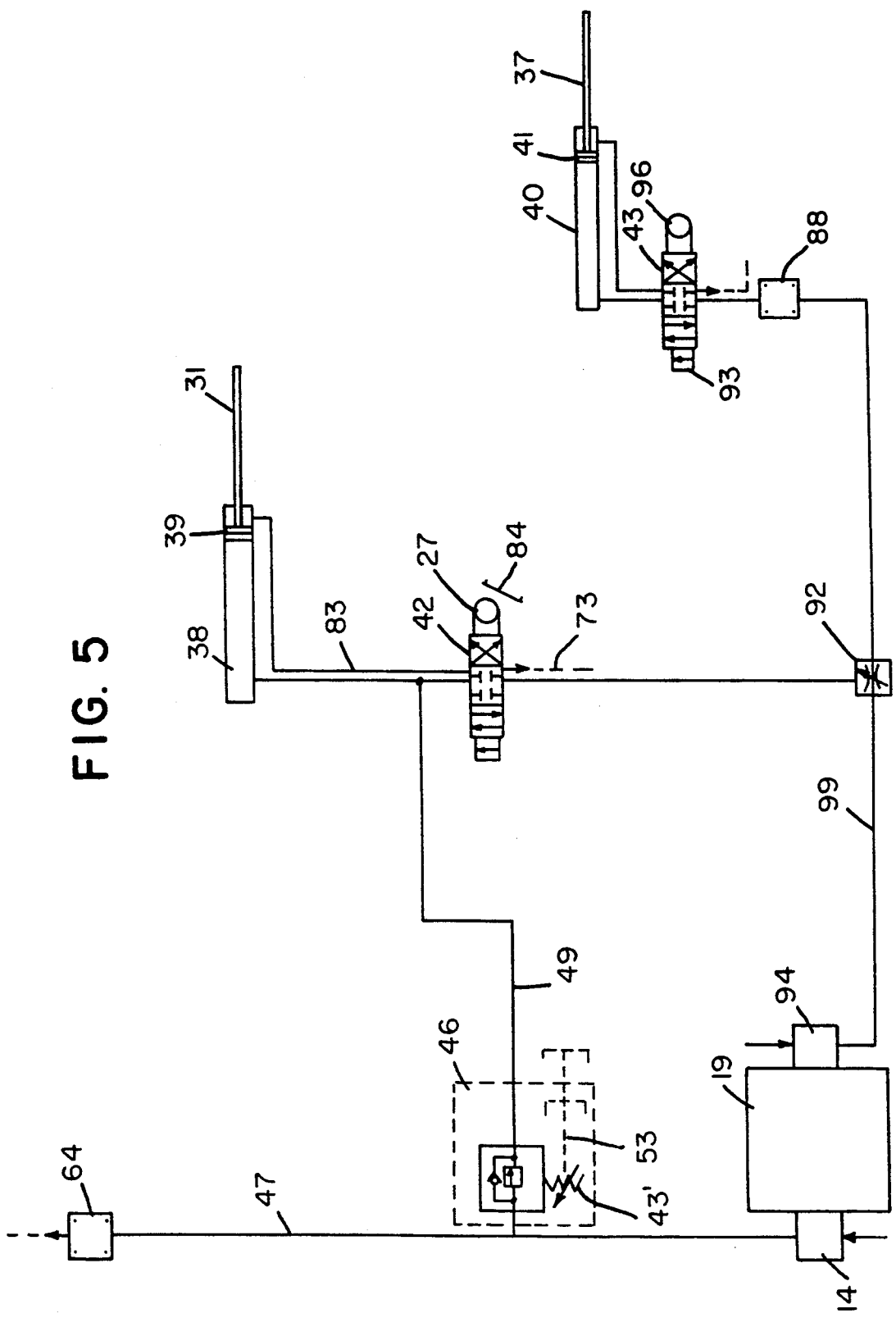
FIG. 5 is a second embodiment of the hydraulic circuit.

In the hydraulic circuit shown in FIG. 4 piston 41 acts to slow feed plate piston 39 when the load on conveyor motor 64 causes pressure in pilot line 47 to increase beyond an acceptable value. As the material on conveyor 60 increases, the pressure in pilot line 47 will likewise increase, and the pressure in pilot line 47 will be reflected on the pilot side of sequence valve 46. Should the pressure in pilot line 47 reach the pressure in line 99, pilot line 47, will slow feed plate 30 reducing the load on conveyor 60.

A conveyor 60 unloads its load, pressure in pilot line 47 will decrease allowing flow control valve 46 to increase the rate of speed of the feed plate piston 39 so that not to overload conveyor 60.

The foregoing specification sets forth the invention in its preferred, practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A screening plant comprising;
   a conveyor, a loading means and a hydraulic motor adapted to drive said conveyor;
   a first screen between said conveyor and said loading means to receive said material from said loading means and to deliver said screened material to said conveyor;
   a first fluid means connected to said hydraulic motor;
   said first fluid means having pressure proportional to the amount of said material on said conveyor;
   a second fluid means connected to said loading means for driving said loading means; and,
   a control means connected to said first fluid means and to said second fluid means and having means to stop said loading means when said material on said conveyor causes said pressure of said first fluid means to increase beyond a predetermined value.

2. The screening plant recited in claim 1 wherein said loading means comprises a feed plate disposed adjacent said first screen for interrupting said material to be screened from said first screen.

3. The screening plant recited in claim 2 wherein said loading means further comprises a grizzly grate above said feed plate; and,
   a first actuating means which consists of a first three way valve for connecting said loading means to said second fluid means to move said loading means to discharge said material.

4. The screening plant recited in claim 3 wherein said feed plate is connected to a first cylinder; and,
   said control means disconnects said first fluid means from said first cylinder when said load on said conveyor is increased by a predetermined amount.

5. The screening plant recited in claim 3 wherein a second actuating means is provided for said first hydraulic cylinder; and
   said second actuating means being supported on a said screening plant and adapted to be engaged by said feed plate when said feed plate reaches full open position.

6. The plant recited in claim 3 wherein said first actuating means is engaged by said feed plate when said feed plate is in full open position; and,
   said first three-way valve connects said second fluid means to said first cylinder moving said feed plate to a closed position.

7. The plant recited in claim 3 wherein
   said grizzly grate is pivoted to said screening plant and a second cylinder is attached to said grizzly grate to swing said grizzly grate to an inclined position for emptying said material from said grizzly grate when said feed plate reaches its open position; and, a second three-way valve is supported on said feed plate and activated by said feed plate wherein said feed plate reaches its open position connecting said second cylinder to said second fluid means to activate said second cylinder to swing said grizzly grate to a discharged position.

8. The screening plant recited in claim 7 wherein a second screen is disposed between said first screen and said conveyor.

9. The screening plant recited in claim 8 wherein said feed plate engages said control means when said second three-way valve connects said second fluid means to said second cylinder to swing said grizzly grate to an inclined position.

10. The screening plant recited in claim 9 wherein said second three-way valve is activated by said feed plate to reverse said second three-way valve connecting said second fluid means to said second cylinder when said feed plate is moved to a full open position.

11. The screening plant recited in claim 4 wherein an auxiliary feed plate cylinder is provided;
    said auxiliary feed plate cylinder is connected in parallel relation with said first mentioned feed plate cylinder;
    said auxiliary feed plate cylinder having a piston rod engaging said feed plate wherein said feed plate is in closed position; and,
    said auxiliary feed plate cylinder being substantially shorter than said feed plate cylinder and adapted to exert a force on said feed plate cylinder during the first part of its travel from closed to open position.

12. The screening plant recited in claim 14 wherein said loading means includes a front end loader having said loading bucket adapted to engage said actuating means to start said feed plate toward said open position.

13. The screening plant recited in claim 13 wherein said feed plate has means to engage said actuating means to reverse said grizzly grate when said grizzly grate is completely open.

* * * * *